July 21, 1942.                R. W. BROWN                2,290,620
                           VEHICLE SUSPENSION
                           Filed Jan. 5, 1940
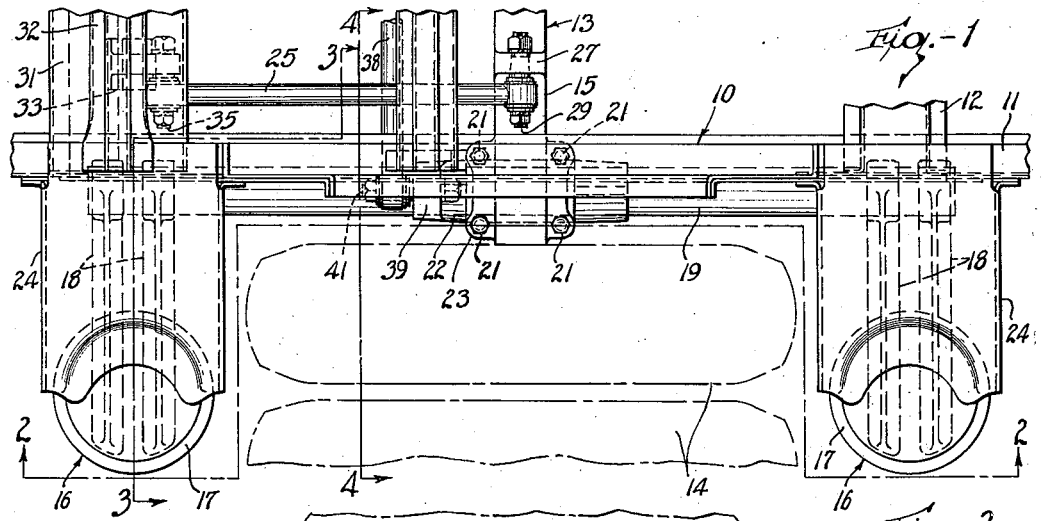
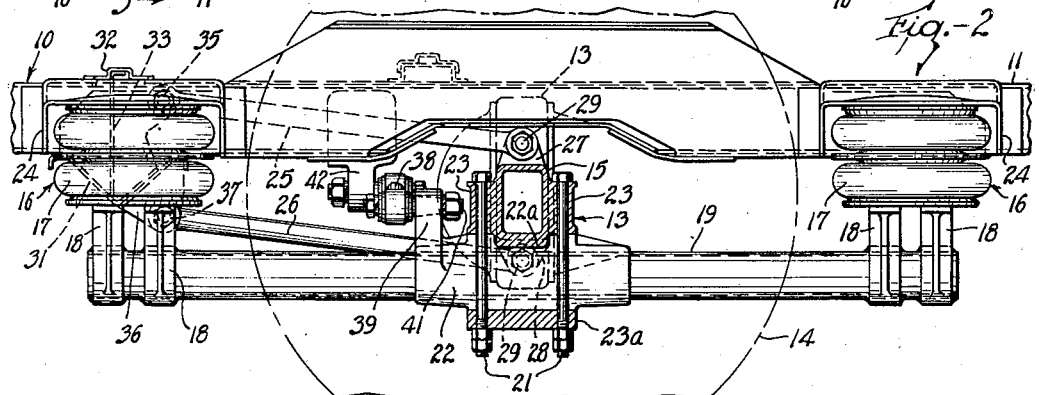
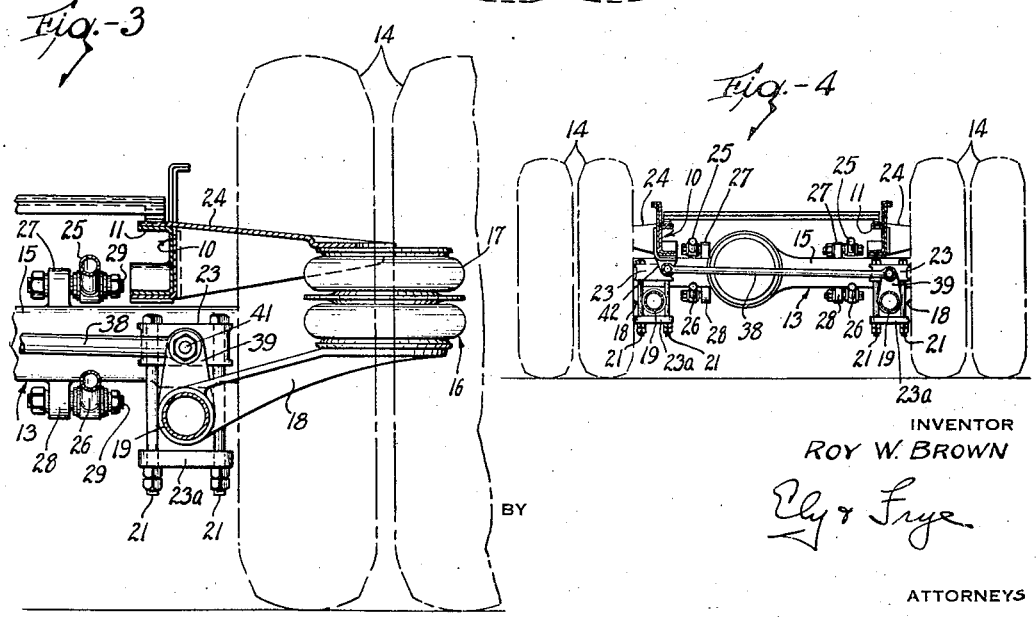
INVENTOR
ROY W. BROWN
BY Ely & Frye
ATTORNEYS Patented July 21, 1942

2,290,620

UNITED STATES PATENT OFFICE 2,290,620

VEHICLE SUSPENSION

Roy W. Brown, Akron, Ohio, assignor to The Firestone Tire & Rubber Company, Akron, Ohio, a corporation of Ohio Application January 5, 1940, Serial No. 312,527

1 Claim. (Cl. 280—124)

This invention relates to vehicle suspensions, more especially to vehicle suspensions of the type wherein the frame or body is mounted on the axles of the vehicle by means having no inherent lateral stability.

One chief object of the invention is to provide improved torque members for controlling the longitudinal movement of the axle relative to the frame of a vehicle of the above type, and to provide a sturdy but simple connection for securing the axle to the frame in said vehicles.

Another object is to mount the body on the axle so as to have a minimum of body roll and to retain the body in predetermined relation to the axle in said vehicles.

The above and other objects will be made apparent by the following specification which will be described with particular reference to the accompanying drawing in which:

Figure 1 is a plan of one side of a vehicle having the suspension of the invention operatively associated therewith;

Figure 2 is a sectional elevation, on line 2—2 of Figure 1;

Figure 3 is a sectional elevation on line 3—3 of Figure 1; and

Figure 4 is a sectional elevation on line 4—4 of Figure 1 showing the total rear portion of the vehicle of Figure 1.

Referring particularly to Figure 1 of the drawing, there is shown a fragment of a vehicle frame 10 that includes a longitudinally extending channeled member 11. This member 11 is connected to a similar member (not shown) on the other side of the frame 10 by a transverse bar 12, which also may be channel shaped, and which is located in the frame 10 behind an axle assembly 13 used to mount the vehicle carried by the frame 10. The axle assembly 13 includes a pair of dual, pneumatic tire wheels 14, 14 which are suitably journalled upon a hollow, rectangular axle housing 15 which is underneath and extends across (and beyond) the frame 10. The construction of the invention will be described with reference to one side of the vehicle, it being understood that the remaining side is similarly constructed.

The frame 10 is resiliently supported upon the axle by any suitable means which are without stability longitudinally of the vehicle. These means may comprise four pneumatic suspension devices 16 that are arranged in pairs on each side of the vehicle frame, one device of each pair being disposed forwardly of the axle and one being disposed rearwardly thereof. Each of the suspension devices includes a hollow, resilient bellows member 17, the interior of which is connected to a suitable reservoir means (not shown) carried by the vehicle, the air flow therebetween being controlled by valve means (not shown) to cushion bound and to retard rebound of the frame 10. As the specific construction of the pneumatic suspension devices 16 is not part of the present invention, they will not be described in greater detail herein.

In order to obtain stability in the mounting of the frame 10, the suspension devices mounting it on the axle assembly are located as far as practical from the longitudinal center line of the frame 10, since the stability varies as the cube of that distance. Thus the suspension devices 16 are carried by bracket arms 18 which are secured, as by welding, to a tubular arm 19 adjacent the ends thereof. The tubular arm in turn is bolted to the axle housing 15 by bolts 21. The connection of the tubular arm 19 to the axle housing is facilitated by placing sleeves 22, having seating portions 22a formed on the upper edges thereof, on the tubular arm 19 and by forming integral, apertured brackets 23 on each side of the axle housing at the ends thereof. Then the axle housing is seated on the sleeves 22 and the bolts 21 extend through the brackets 23 (Figure 2) to mount the suspension devices 16, 16 on the axle housing. An apertured pressure plate 23a may be placed under each sleeve 22 to distribute pressures set up by the bolts 21. Outwardly extending channel brackets 24, 24 are suitably secured to the channeled member 11 and form an upper seat, or load transmitting member for the suspension devices 16 (Figures 1 and 2). Note that the suspension devices 16 are mounted in the medial plane of the dual tired wheels, as this mounts the vehicle frame on the same effective base as the running gear and is a feature of the invention.

To control longitudinal movement of the axle housing relative to the frame, torque rods 25, 26 are pivotally connected therebetween on each side of the frame 10 so as to form parallelograms with the parts of the frame and axle housing to which they are connected. To this end, apertured brackets 27 and 28 are carried by, or integrally formed on, the upper and lower sides, respectively, of the axle housing 15. Pins 29 having rubber bushings thereon (not shown) secure one end of the rods 25, 26 to the brackets 27, 28, respectively. The frame is further strengthened transversely and anchoring means for the forward ends of the rods 25, 26 are provided in any suitable manner, such as by securing a roughly V-shaped metallic strip 31 across the frame at the bottom thereof and a channeled metal strip 32 to the top of the frame in a vertical plane with the V strip 31. A special bracket member 33 (Figure 2) extends between and is secured to the V-shaped and channeled metal strips 31 and 32. The bracket 33, which projects rearwardly of the vehicle from the apex of the strip 31, is aligned with the brackets 27, 28 and the forward end of the rod 25 is secured thereto by a rubber cover pin 35. A further bracket plate 36 is secured to the lower side of and extends rearwardly from the V strip 31. The forward end of rod 26 is resiliently secured to this plate 36 by a rubber covered pin 37 whereby the parallelogram is completed and the relative longitudinal and vertical movement of the frame and running gear is controlled.

Lateral movement of the frame on the axle housing is controlled by a transversely extending stabilizer rod 38 which is pivotally secured therebetween. One end of the stabilizer rod 38 is secured to a bracket 39, usually formed integrally with the sleeve 22 (Figure 3) by a pin 41 which has a rubber sleeve (not shown) associated therewith to permit limited movement therebetween. The other end of the stabilizer rod is similarly secured to a bracket 42 carried by the frame on the opposite side of the vehicle. Thus the stabilizer rod cooperates with the suspension devices to control and limit lateral and vertical movement of the frame on the running gear.

By connecting the axle housing to the frame in the above-described manner, controlled movement therebetween only may occur. The suspension devices 16 permit and control vertical movement of the frame relative to the running gear while the torque rods 25, 26 prevent relative longitudinal movement therebetween. Then the stabilizer rods allow only controlled lateral and vertical movement of the frame on the running gear so that the desired relationship is maintained therebetween. Note that all connections between the running gear and the frame which possibly might be subjected to universal movement due to one wheel dropping relative to the other, etc., utilize rubber sleeves, bushings, rubber covered pins, or the like, in making the connection, whereby slight universal movement is permitted. The positioning of the suspension devices before and behind the axle housing and in the medial plane of the dual wheels contributes to mounting the frame stably. On arcuate movement of the axle housing due to driving or brake torque, one suspension device will be compressed while another will be tensioned so that both will resist appreciable rotative movement of the axle housing. Then too, the parallelogram connection of the axle housing and frame also reduces arcuate movement of the axle housing as again the two members react against each other, or one is tensioned and the other compressed by torsional stresses on the axle housing. Provision of the stabilizer rod and the position of the suspension devices reduces the relative lateral movement of the frame or body on the axle housing so that a very stable vehicular suspension is provided by the invention whereby the objects of the invention are achieved.

While one embodiment of the invention is completely described and illustrated herein, it will be apparent that various modifications thereof may be made without departing from the scope of the invention as defined in the appended claim.

What is claimed is:

In a vehicle suspension, a vehicle frame, an axle housing having dual wheels associated therewith at the ends thereof, said axle housing having brackets formed on the upper and lower portions thereof adjacent its ends, rods pivotally connected between said brackets on said axle housing and said frame, means mounting said rods on said axle housing and said frame for slight universal movement, said axle housing and said frame being constructed and arranged to mount said rods in parallel relation and to form a parallelogram therewith, said rods controlling vertical and longitudinal movement of said axle housing relative to said frame, tubular members extending longitudinally of said vehicle frame secured to said axle housing adjacent the ends thereof, arms carried by said tubular members at the ends thereof and extended out laterally from said vehicle frame, brackets carried by and extending out laterally from said vehicle frame in front of and behind said axle housing, said arms and said brackets mounted on said frame extending laterally outwardly of said frame to the medial plane of said dual wheels, resilient load supporting means operatively connected between said arms and said brackets in the medial plane of said dual wheels to mount said frame on said axle housing, and stabilizer means extending transversely of the vehicle and being pivotally connected to said vehicle frame and said axle housing to control lateral movement therebetween.

ROY W. BROWN.